(12) United States Patent  
Shenderov

(10) Patent No.: US 7,255,780 B2
(45) Date of Patent: Aug. 14, 2007

(54) METHOD OF USING ACTUATORS FOR MICROFLUIDICS WITHOUT MOVING PARTS

(75) Inventor: Alexander David Shenderov, Raleigh, NC (US)

(73) Assignee: Nanolytics, Inc., Raleigh, NC (US)

( * ) Notice: Subject to any disclaimer, the term of this patent is extended or adjusted under 35 U.S.C. 154(b) by 0 days.

(21) Appl. No.: 10/430,816

(22) Filed: May 6, 2003

(65) Prior Publication Data

US 2004/0031688 A1   Feb. 19, 2004

Related U.S. Application Data

(63) Continuation of application No. 09/490,769, filed on Jan. 24, 2000, now Pat. No. 6,565,727.

(60) Provisional application No. 60/117,002, filed on Jan. 25, 1999.

(51) Int. Cl.
    *G01N 27/447* (2006.01)
(52) U.S. Cl. ........................ 204/450; 204/600
(58) Field of Classification Search ........ 204/600–605, 204/450–455, 643, 547
    See application file for complete search history.

(56) References Cited

U.S. PATENT DOCUMENTS

| | | | |
|---|---|---|---|
| 4,390,403 A * | 6/1983 | Batchelder | 204/547 |
| 4,418,346 A | 11/1983 | Batchelder | 340/107 |
| 4,582,391 A | 4/1986 | Legrand | 350/96.2 |
| 4,636,785 A | 1/1987 | Le Pesant | 345/37 |
| 4,701,021 A | 10/1987 | Le Pesant | 350/267 |
| 5,181,016 A | 1/1993 | Lee | 345/84 |
| 5,472,577 A | 12/1995 | Porter | 204/1.11 |
| 5,571,410 A | 11/1996 | Swedberg | 210/198.2 |
| 5,731,792 A | 3/1998 | Sheridon | 345/84 |
| 5,980,719 A | 11/1999 | Cherukuri | 204/600 |
| 5,992,820 A | 11/1999 | Fare | 251/129.01 |
| 6,565,727 B1 * | 5/2003 | Shenderov | 204/600 |

OTHER PUBLICATIONS

F. Berge; *Electrocopillarity & writing of insulator films by water*; C.R. Acad. Sci. Paris, 317, Sec 11, pp 157-163.(1993).

Colgate, Matsumoto; *An Investigation of Electrowetting-Based Microactuation* ; J. Vac. Sci-Technol. A vol. 8#4 pp 3625-3633 (Jul./Aug. 1990).

Washizv; *Electrostatic Acturtional Liquid Droplets for Microreaction Applications*; IEEE trans. Ind. App v 34, No. 4 pp 732-737; Jul./Aug. 1998.

Welters, Fokkink; *Fast Electrically Switchable Capillary Effects*; Languwir vol. 14, pp 1535-1538 (1998).

* cited by examiner

*Primary Examiner*—Alex Noguerola
(74) *Attorney, Agent, or Firm*—Myers Bigel Sibley & Sajovec

(57) ABSTRACT

A series of microactuators for manipulating small quantities of liquids, and methods of using these for manipulating liquids, are disclosed. The microactuators are based on the phenomenon of electrowetting and contain no moving parts. The force acting on the liquid is a potential-dependent gradient of adhesion energy between the liquid and a solid insulating surface.

6 Claims, 5 Drawing Sheets

US 7,255,780 B2

METHOD OF USING ACTUATORS FOR MICROFLUIDICS WITHOUT MOVING PARTS

CROSS REFERENCES TO RELATED APPLICATIONS

This application is a continuation of patent application Ser. No. 09/490,769, filed Jan. 24, 2000, now U.S. Pat. No. 6,565,727, which claims the benefit of provisional patent application No. 60/117,002, filed on Jan. 25, 1999.

FIELD OF THE INVENTION

This invention relates generally to the fields of laboratory automation, microfabrication and manipulation of small volumes of fluids (microfluidics), in such a manner so as to enable rapid dispensing and manipulation of small isolated volumes of fluids under direct electronic control. More specifically, the invention relates to a method of forming and moving individual droplets of electrically conductive liquid, and devices for carrying out this method.

BACKGROUND OF THE INVENTION

Miniaturization of assays in analytical biochemistry is a direct result of the need to collect maximum data from a sample of a limited volume. This miniaturization, in turn, requires methods of rapid and automatic dispensing and manipulation of small volumes of liquids (solvents, reagents, samples etc.) The two methods currently employed for such manipulation are, 1) ink jetting and 2) electromigration methods in capillary channels: electroosmosis, elecrophoresis and/or combination thereof. Both methods suffer poor reproducibility.

Ink jetting is based on dispensing droplets of liquid through a nozzle. Droplet expulsion from the nozzle is effected by a pressure pulse in the reservoir connected to the nozzle. The pressure pulse itself is effected by an electric signal. The droplets are subsequently deposited on a solid surface opposing the nozzle. The relative position of the nozzle and the surface is controlled by a mechanical device, resulting in deposition of droplets in a desired pattern. Removal of the droplets is typically effected by either washing or spinning (centrifugal forces).

While ink jetting is a dispensing method generally applicable to a wide variety of liquids, the volume of the deposited droplets is not very stable. It depends on both the nature of the liquid being deposited (viscosity, density, vapor pressure, surface tension) and the environment in the gap between the surface and the nozzle (temperature, humidity). Ink jetting technology does not provide means to manipulate droplets after they have been deposited on the surface, except for removing them.

Electromigration methods are based on mobility of ions in liquids when electric current is passed through the liquids. Because different ions have different mobilities in the electric field, the composition of liquid being manipulated generally changes as it is being transported. While this feature of electromigration methods is useful for analytical purposes, because it allows physical separation of components of mixtures, it is undesirable in general micromanipulation techniques.

Additionally, the need to pass electrical current through the liquid results in heating of the liquid, which may cause undesirable chemical reactions or even boiling. To avoid this, the electrical conductivities of all liquids in the system are kept low, limiting the applicability of electromigration methods.

The need to pass electrical current through the liquid also requires that the control electrodes be electrically connected through an uninterrupted body of conductive liquid. This requirement additionally complicates precision dispensing and results in ineffective use of reagents, because the metered doses of a liquid are isolated from a continuous flow of that liquid from one electrode to another.

Additionally, ions present in the liquid alter the electric field in that liquid. Therefore, changes in ionic composition in the liquid being manipulated result in variations in resultant distribution of flow and material for the same sequence of control electrical signals.

Finally, the devices for carrying out the electromigration methods have connected channels (capillaries), which are used to define liquid flow paths in the device. Because the sizes of these capillaries and connections among them are optimized for certain types of manipulations, and also for certain types of liquids, these devices are very specialized.

SUMMARY OF THE INVENTION

The present invention provides microchip laboratory systems and methods of using these systems so that complex chemical and biochemical procedures can be conducted on a microchip under electronic control. The microchip laboratory system comprises a material handling device that transports liquid in the form of individual droplets positioned between two substantially parallel, flat surfaces. Optional devices for forming the droplets are also provided.

The formation and movement of droplets are precisely controlled by plurality of electric fields across the gap between the two surfaces. These fields are controlled by applying voltages to plurality of electrodes positioned on the opposite sides of the gap. The electrodes are substantially planar and positioned on the surfaces facing the gap. At least some of the electrodes are electrically insulated from the liquid in the gap.

The gap is filled with a filler fluid substantially immiscible with the liquids which are to be manipulated. The filler fluid is substantially non-conductive. The wetting properties of the surfaces facing inside the gap are controlled, by the choice of materials contacting the liquids or chemical modification of these materials, so that at least one of these surfaces is preferentially wettable by the filler fluid rather than any of the liquids which are to be manipulated.

The operating principle of the devices is known as electrowetting. If a droplet of polar conductive liquid is placed on a hydrophobic surface, application of electric potential across the liquid-solid interface reduces the contact angle, effectively converting the surface into more hydrophilic. According to the present invention, the electric fields effecting the hydrophobic-hydrophilic conversion are controlled by applying an electrical potential to electrodes arranged as an array on at least one side of the gap. The electrodes on the other side may or may not be arranged in a similar array; in the preferred embodiment, there is array of electrodes only on one side of the gap, while the other has only one large electrode covering substantially the entire area of the device.

At least on one side of the gap, the electrodes are coated with an insulator. The insulator material is chosen so that it is chemically resistant to the liquids to be manipulated in the device, as well as the filler fluid.

By applying an electrical potential to an electrode or a group of electrodes adjacent to an area contacted by polar liquid, the hydrophobic surface on top of these electrodes is converted to hydrophilic and the polar liquid is pulled by the surface tension gradient (Marangoni effect) so as to maximize the area overlap with the charged group of electrodes.

By removing an electric potential from an electrode positioned between the extremities of an elongated body of polar liquid, the portion of formerly hydrophilic surface corresponding to that electrode is made hydrophobic. The gradient of surface tension in this case acts to separate the elongated body of liquid into two separate bodies, each surrounded by a phase boundary. Thus, individual droplets of polar liquid can be formed by alternatively applying and removing an electric potential to electrodes. The droplets can be subsequently repositioned within the device as discussed above.

Examples of appropriate coating materials include SiN and BN, deposited by any of the conventional thin-film deposition methods (sputtering, evaporation, or preferably chemical vapor deposition) and parylene™, deposited by pyrolytic process, spin-on glasses (SOGs) and polymer coatings (polyimides, polymethylmetacrylates and their copolymers, etc.), dip- and spray-deposited polymer coatings, as well as polymer films (Teflon™, polyimides etc.) applied by lamination.

DETAILED DESCRIPTION OF THE INVENTION

Figure 1:
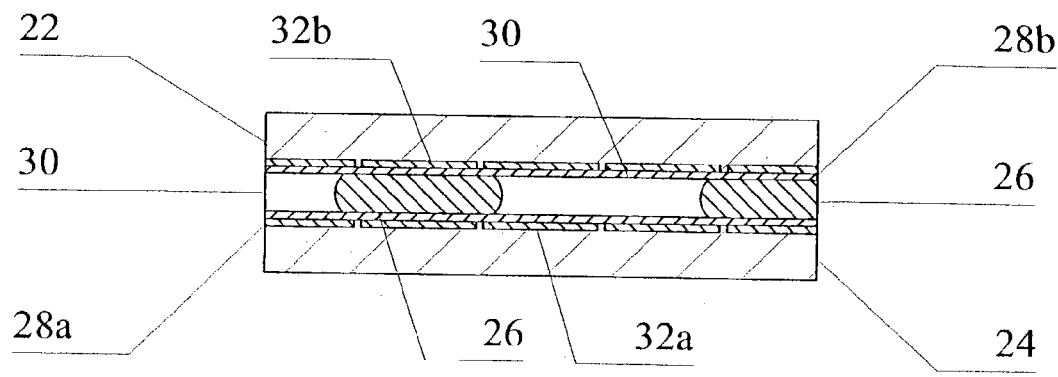
FIG. 1 Cross-section of a planar electrowetting actuator according to the invention
22—top wafer
24—bottom wafer
26—liquid droplet
28a—bottom hydrophobic insulating coating
28b—top hydrophobic insulating coating
30—filler fluid
32a—bottom control electrodes
32b—top control electrodes
   FIG. 2 Pump assembly
   FIG. 3 Drop meter
34—contact pad
36—cutoff electrode
   FIG. 4 Active reservoir
38—hydrophobic rim
40—reservoir electrodes
   FIG. 5 Array
42a—transport lines
42b—test areas
   FIG. 6 Vortexer
44—sectorial electrode
   FIG. 7 Zero-dead-volume valve
62—gate electrode
64a—first supply line
64b—second supply line
64c—common line
   FIG. 8 Decade dilutor
46—diluent line
48—reagent supply line
50—vortexer
52—undiluted reagent outlet
54—first stage outlet
56—second stage outlet
58—third stage outlet
60—fourth stage outlet

According to the invention, there is provided a chamber filled with a fluid, with flat electrodes 32a,b on opposite surfaces (FIG. 1). The chamber is formed by the top 22 and the bottom 24 wafers. The manipulated liquid is presented in the form of droplets 26. The fluid 30 filling the chamber should be immiscible with the liquid that is to be manipulated, and be less polar than that liquid. For example, if liquid 26 is an aqueous solution, the filling fluid 30 may be air, benzene, or a silicone oil. The electrodes have electrical connections allowing an outside control circuit to change their potentials individually or in groups. At least some of the electrodes have insulating, hydrophobic coating 28a,b separating them from the inside of the chamber, and the voltage is applied in such a manner that no DC voltage difference is applied to any two non-insulated electrodes.

EXAMPLE 1—a pump

Figure 2:
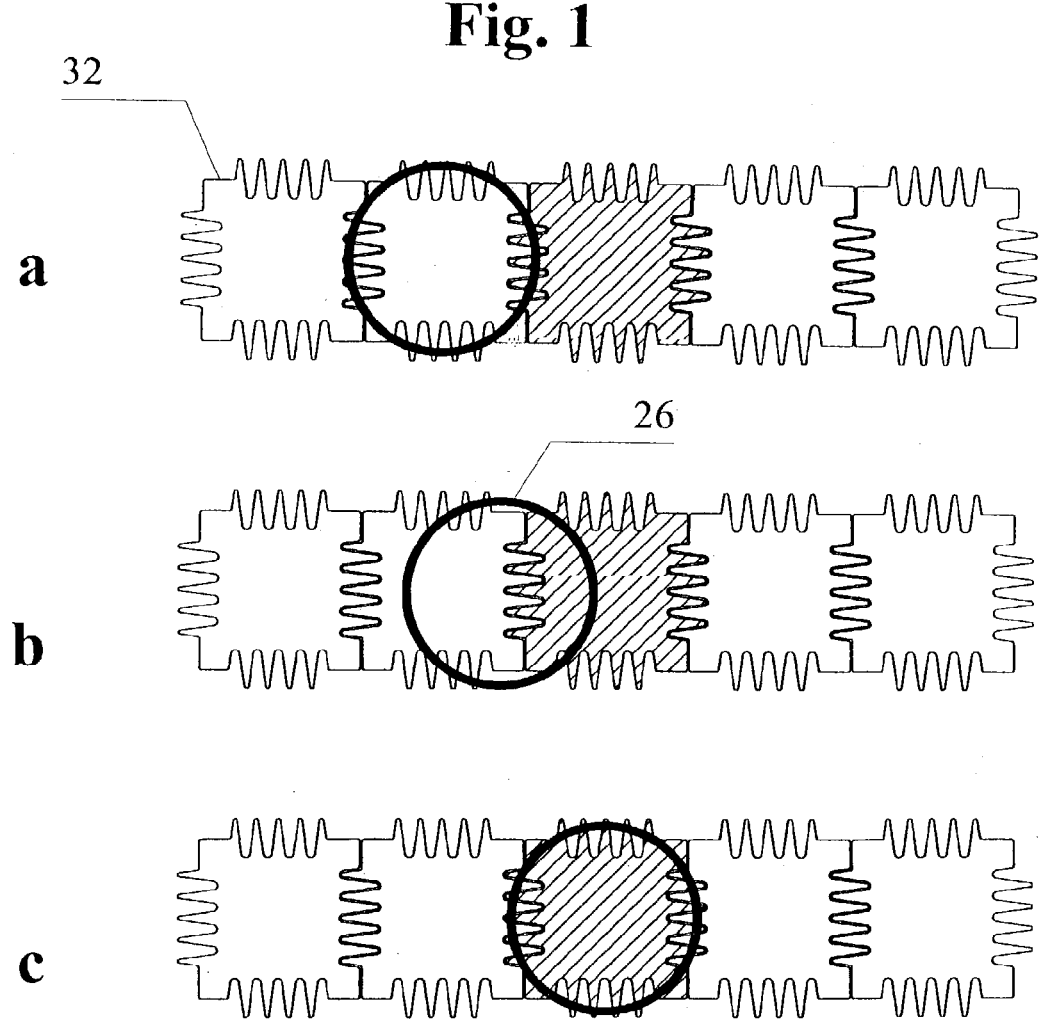

The linear arrangement of electrodes shown in FIG. 2 is an integral pump. A droplet of polar liquid, or a streak of several electrode lengths, can be moved along by applying a wetting potential to an electrode on one side of it and removing the wetting potential from the last electrode under the other side of the streak.

To aid the effect of electrowetting in moving liquid from one electrode to another, in a preferred embodiment the gap separating two adjacent electrodes is not straight. Preferably, it has either sawtooth or meander shape, preferably with rounded corners. The depths and widths of the interdigitated features of the adjacent electrodes are preferably chosen so as to promote moving liquid from one electrode to another when the voltage is applied to the latter electrode, as shown in FIGS. 2a–c. The initial position of the droplet 26 is shown in FIG. 2a. The hatching of an electrode 32 adjacent to the position of the droplet indicates that that electrode is connected to a voltage source. The droplet 26 moves (FIG. 2b) so as to align itself with the electric field of that electrode (FIG. 2c).

EXAMPLE 2—a drop meter

Figure 3:
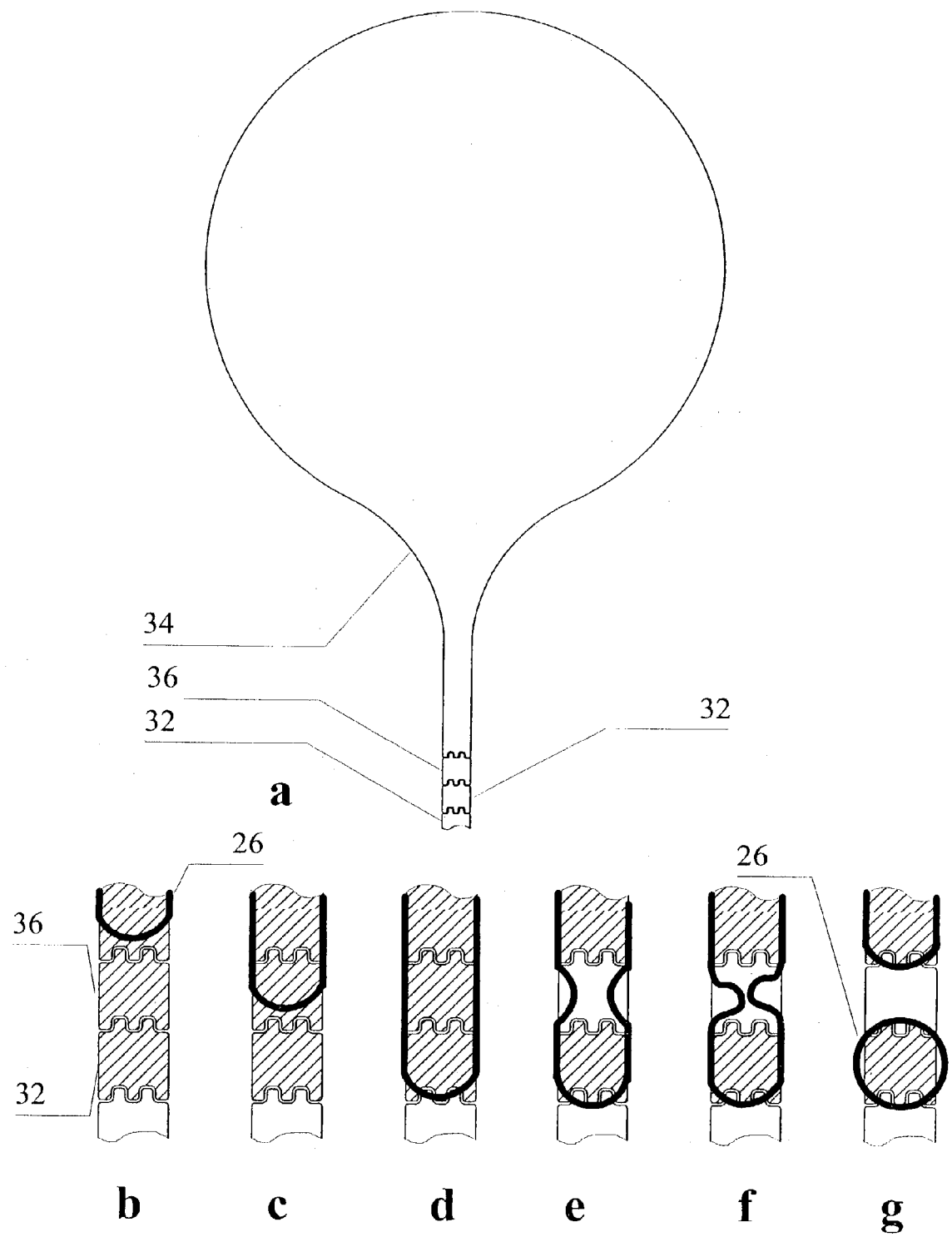

As a convenient interface between a microfluidics device operating in subnanoliter to microliter range of volumes with the outside world, a drop meter is provided. The drop meter comprises an arrangement control pads on one side of the chamber (FIG. 3a). The contact pad 34 is either hydrophilic due to material it is made of, or due to a surface treatment or made hydrophilic by applying a wetting potential to an underlying electrode. The other two control pads have electrodes under the hydrophobic surface.

To operate the drop meter, a wetting potential is first applied to the cutoff electrode 36 and the control electrode 32. As a result of this, the liquid which has covered the surface of the contact pad 34 spreads over the other two pads, 32 and 36 (FIGS. 3b–d). Consequently, the wetting potential is removed from the cutoff electrode 36, making it hydrophobic again. Part of the liquid moves back to the contact pad 34, and is replaced on the cutoff electrode 36 with the filling fluid (FIGS. 3e–f). As a result, an isolated droplet of liquid (26, FIG. 3g) is formed on the control electrode 32. The size of the droplet is determined by the area of the control electrode 32 and the distance between the two surfaces forming the working chamber of the device.

EXAMPLE 3—an active reservoir

Figure 4:
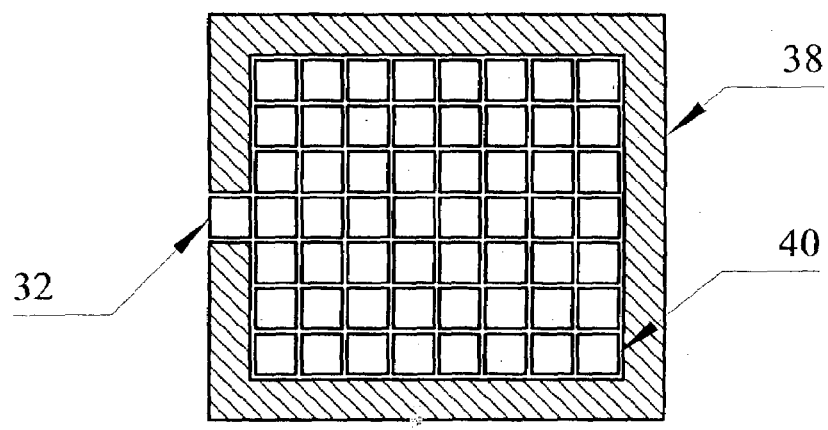

A reagent solution may be stored in an active reservoir in a sealed device and delivered under electronic control to a reaction site. An example of such reservoir is shown in FIG. 4. The delivery is effected by applying the wetting potential to the first electrode 32 of the transport line and removing the potential sequentially from the reservoir electrodes 40, for example beginning from the corner(s) furthermost from the transport line. To allow for long storage of the devices with power off, the coating within the reservoir area is only moderately hydrophobic, and the rim 38 around that area is extremely hydrophobic. The polar liquid will not spill beyond the rim 38, allowing long shelf life of the device.

EXAMPLE 4—an array

Figure 8:
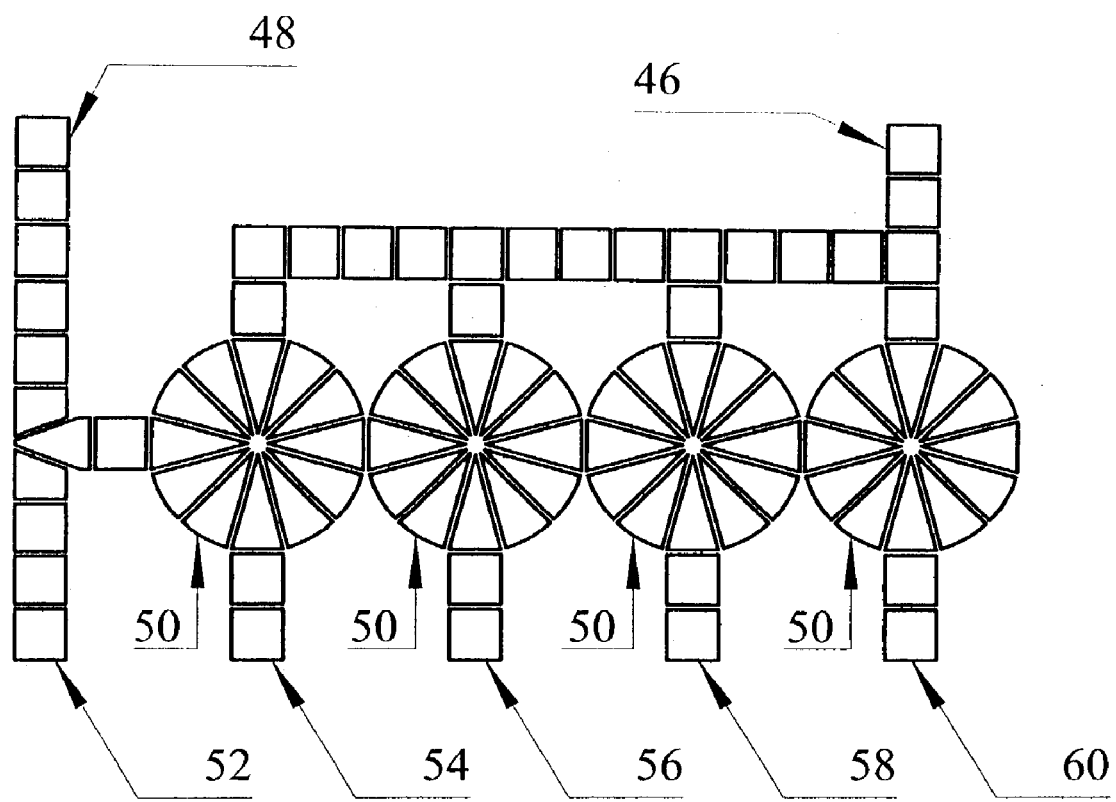

Droplets can be moved by electrowetting microactuators in more than one direction. The array shown in FIG. 5 comprises test areas 42b (hatched) and transport lines 42a (open). Reagents are supplied through external transport lines, shown (broken) in the top part of the drawing. Wash and waste lines are arranged similarly. The sources of the reagents may be reagent reservoirs as shown in FIG. 4, drop meters as in FIG. 3, or integral dilution devices such as shown in FIGS. 6,8. In a preferred embodiment, the test pad electrodes are transparent, for example made of indium tin oxide (ITO) or a thin, transparent metal film, to allow for optical detection of molecules immobilized on the pad or trapped in the droplet.

Such an array has utility as a system for parallel synthesis of many different reagents. Both solid-phase synthesis of immobilized compounds and liquid-phase synthesis using immobilized reagents, resins and catalysts are possible. Another use of such an array is a fraction collector for capillary electrophoresis or similar separation methods, whereby each fraction is isolated by a drop meter (similar to that shown in FIG. 3) and placed on its individual pad 32. This will allow long signal accumulation time for optical and radioactive detection methods and therefore improve sensitivity of analysis.

Important features of the electrodes in an array are the width of the gap between the electrodes and the shape of the electrode outline. To avoid accidental mixing of droplets on the test pads, the gaps separating those are straight and relatively wide. On the other hand, the electrodes in the transport lines preferably have interdigitated sawtooth or meander outlines. The gaps between the test pad electrodes and transport line electrodes are also preferably of the meander or sawtooth types.

EXAMPLE 5—a mixer/vortexer

For controlled mixing of solutions, an integral mixer/vortexer is provided (FIG. 6). It comprises a circular arrangement of sectorial electrodes 44, some of which have transport line electrodes adjacent to them. The necessary number of the sectors is filled with each solution to be mixed by consecutively applying the wetting potential to the respective electrodes. The sectors initially filled with different solutions are preferably isolated from each other by the interspersed sectors with filler fluid. Then the potentials on the transport lines are removed, and those on sectorial electrodes are rearranged so as to bring the solutions into contact. The mixing action is achieved by simultaneous removal of filler fluid from some of the sectors and filling other sectors with the filler fluid. In particular, vortexer action is achieved if this is done in a sequential fashion around the circle.

Alternative configurations of electrodes are possible for achieving the same goal of assisting in mixing solutions. For example, some of the sectors in an arrangement similar to that shown in FIG. 6 could be made narrower and longer than the other sectors.

EXAMPLE 6—a zero-dead-volume valve

To rapidly exchange solutions contacting a particular pad in an array, a zero-dead-volume valve is provided. An example of electrode configuration for this application is shown in FIG. 8. Supply lines 64a and 64b are connected to the line 64c through gate electrode 62. Either of the supply lines is operated in the manner described in Example 1, while wetting potential is applied to the gate electrode. Removal of the wetting potential from the gate electrode 62 allows to move one of the solutions back up its supply line before the other is transported down its respective line. This arrangement has utility, for example, in systems for determination of reaction kinetic constants.

EXAMPLE 7—a decade dilutor

A group of mixer/vortexers such as that shown in FIG. 6 can be used, complete with piping, for serial dilutions of reagents. An example of a decade dilutor with five decades is shown in FIG. 8. Each mixer in the decade dilutor is operated in the manner described in the Example 5. Undiluted solution is passed directly through to the line 52; diluted 10 times, down the line 54, and also to the next mixer 50; from there, solution diluted 100 times is passed both down the line 56 and to the next mixer 50 and so forth.

Figure 5:
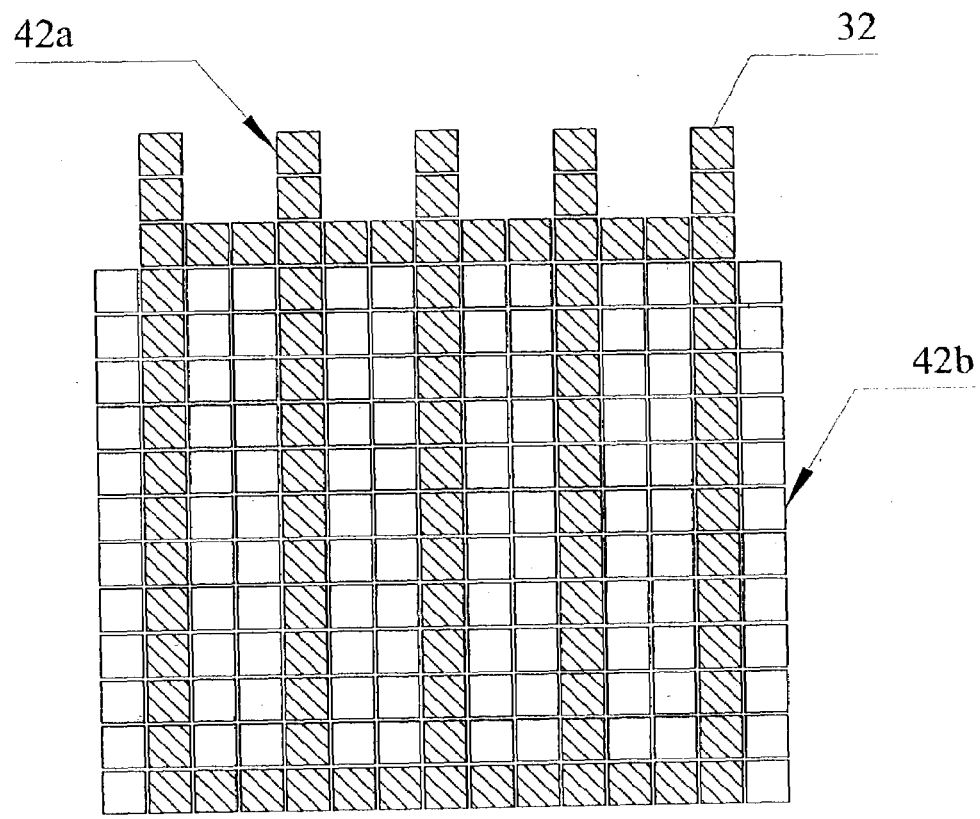
Figure 6:
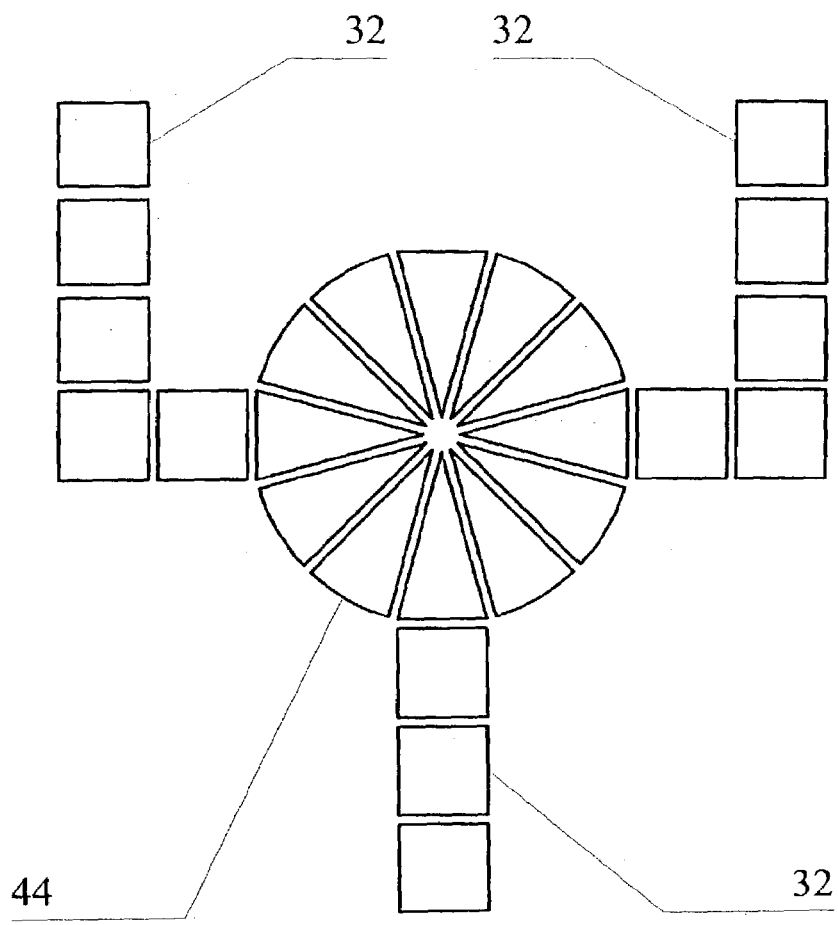
Figure 7:
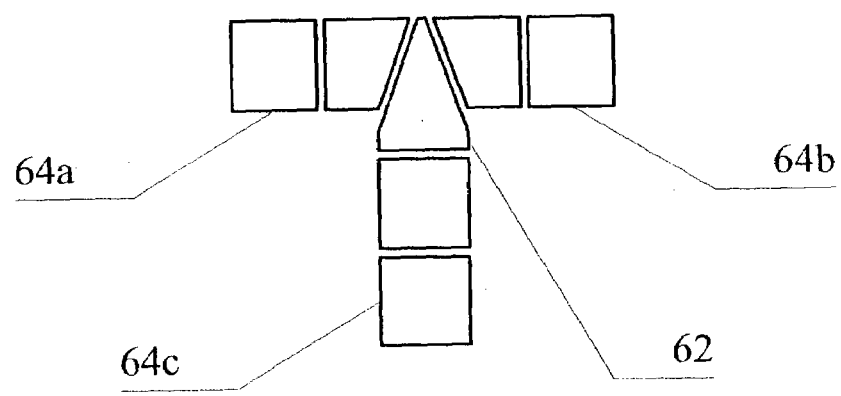

Such dilutors have utility, for example, as elements of a system for determination of binding constants of labeled reagents in solution to those immobilized on test pads of an array (similar to that shown in FIG. 5).

While the present invention has been described in terms of particular embodiments, it should be understood that the present invention lies in the application of the electrowetting liquid propulsion principle to forming and manipulating discrete droplets of liquids rather than a particular structure or configuration of the device. It will be obvious to those skilled in the art that a variety of electrode configurations and arrangements can be substituted for those described in the Examples without departing from the scope of the present invention. In particular, the dimensions in the figures should be understood only as illustrative examples rather than set dimensions defining the scope of the present invention.

I claim:

1. A method of performing a chemical or biochemical reaction in a droplet, comprising:
   providing a device comprising:
   a housing having an internal volume filled with a liquid;
   a plurality of adjacent, electrically isolated lower electrodes positioned in the housing, wherein sequential lower electrodes have substantially contiguous, hydrophobic surfaces, the lower electrodes defining a droplet travel path; and
   at least one electrically isolated upper electrode positioned in the housing opposite the lower electrodes, the upper electrode being covered with a hydrophobic surface;

introducing an electrolytic droplet immiscible with said liquid into the housing and onto a hydrophobic surface of a first lower electrode, the electrolytic droplet containing at least one reactive material;

applying an electrical potential to a second lower electrode adjacent the first lower electrode sufficient to cause the hydrophobic surface thereof to become temporarily more hydrophilic, thereby inducing the electrolytic droplet to move from the first electrode to the second electrode;

repeating the applying step to continue inducing movement of the electrolytic droplet between adjacent electrodes along the droplet travel path to a predetermined location thereon; and carrying out a chemical or biochemical reaction utilizing the reactive material contained in the electrolytic droplet.

2. The method defined in claim 1, wherein the reactive material is selected from the group consisting of: chemical regents, biochemical reagents, chemical reactants, and biochemical reactants.

3. The method defined in claim 1, wherein the electrolytic droplet comprises an aqueous solution.

4. The method defined in claim 1, wherein the at least one upper electrode is a single electrode that covers substantially all of the lower electrodes.

5. The method defined in claim 1, wherein the device further comprises a drop meter that dispenses electrolytic droplets, and wherein the introducing step comprises introducing the electrolytic droplet with the drop meter.

6. The method defined in claim 1, wherein the reaction carried out is a biochemical assay.

* * * * *